(12) United States Patent
Piuzzi et al.

(10) Patent No.: US 8,882,038 B2
(45) Date of Patent: Nov. 11, 2014

(54) SEALING DEVICE BETWEEN A CROSS MEMBER AND INSULATION BLANKET PROVIDED AT AN AIRCRAFT FUSELAGE

(75) Inventors: Olivier Piuzzi, Tournefeuille (FR); Francois Rouyre, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 443 days.

(21) Appl. No.: 13/302,165

(22) Filed: Nov. 22, 2011

(65) Prior Publication Data
US 2012/0126059 A1 May 24, 2012

(30) Foreign Application Priority Data
Nov. 24, 2010 (FR) ...................... 10 59668

(51) Int. Cl.
B64C 1/00 (2006.01)
B64C 1/40 (2006.01)

(52) U.S. Cl.
CPC ...................... B64C 1/403 (2013.01)
USPC ........................................... 244/119; 244/131

(58) Field of Classification Search
USPC ............... 244/129.1, 129.2, 131, 119, 117 R; 52/407.4, 404.2
See application file for complete search history.

(56) References Cited

U.S. PATENT DOCUMENTS

| | | | |
|---|---|---|---|
| 5,577,688 A * | 11/1996 | Sloan | 244/117 R |
| 5,779,193 A * | 7/1998 | Sloan | 244/117 R |
| 5,811,167 A * | 9/1998 | Norvell | 428/76 |
| 5,827,598 A | 10/1998 | Larsen et al. | |
| 5,866,231 A * | 2/1999 | Bodin et al. | 428/131 |
| 6,768,058 B2 | 7/2004 | Pallapothu | |
| 7,584,582 B1 * | 9/2009 | Hutter, III | 52/506.02 |
| 2005/0029404 A1 * | 2/2005 | Hogie et al. | 244/158 A |
| 2009/0226663 A1 * | 9/2009 | Hutter, III | 428/99 |
| 2012/0119024 A1 * | 5/2012 | Redecker | 244/1 N |
| 2013/0161123 A1 * | 6/2013 | Morgan et al. | 181/175 |

FOREIGN PATENT DOCUMENTS

| | | |
|---|---|---|
| EP | 0 375 577 | 6/1990 |
| EP | 0 845 409 | 6/1998 |
| EP | 1 403 991 | 3/2004 |
| EP | 2 063 163 | 5/2009 |
| WO | 2004/074596 | 9/2004 |

OTHER PUBLICATIONS

French Search Report dated Aug. 1, 2011, corresponding to Foreign Priority Application No. 10 59668.

* cited by examiner

*Primary Examiner* — Tien Dinh
*Assistant Examiner* — Michael A Fabula
(74) *Attorney, Agent, or Firm* — Young & Thompson

(57) ABSTRACT

An insulation blanket to be connected at the inside surface (16) of an aircraft fuselage, includes at least one opening that allows a through element (20) to pass, at which is connected a sealing device, characterized in that this sealing device includes a core (28) that is combined with a body (30) that extends over a closed contour delimiting the opening (26), with the core (28) having a spring action that tends to flatten the body (30) against the through element (20) over at least a part of the circumference of the opening (26).

19 Claims, 4 Drawing Sheets

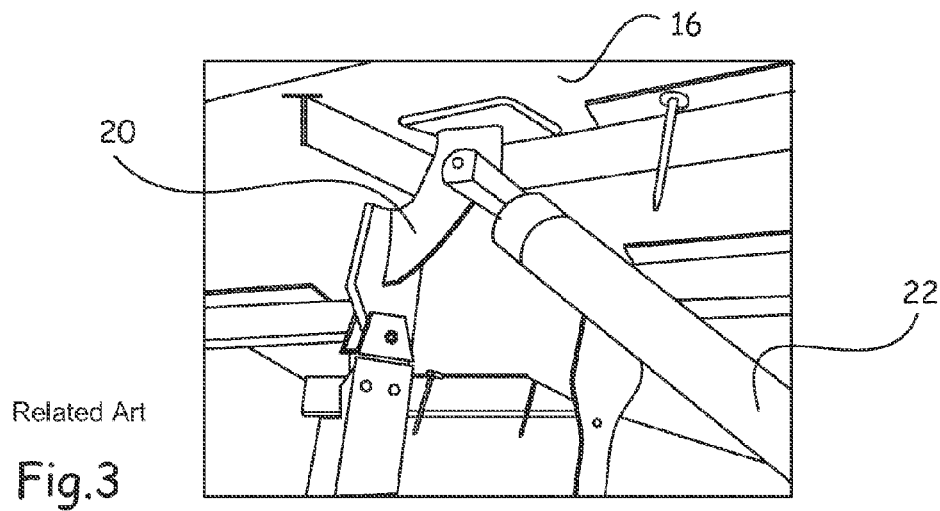
Related Art
Fig.3
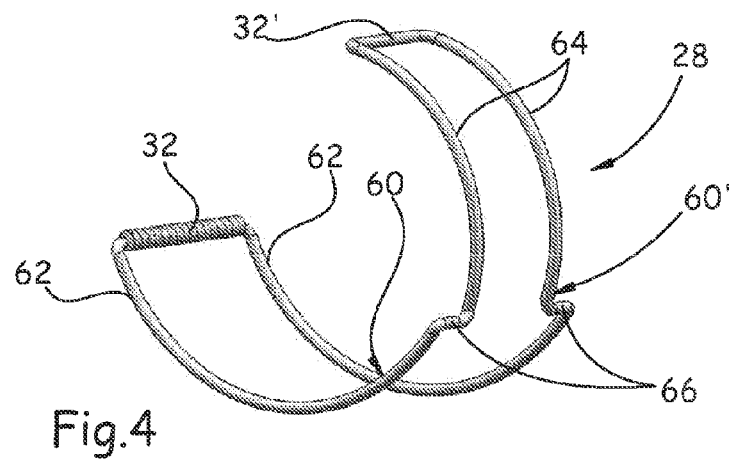
Fig.4
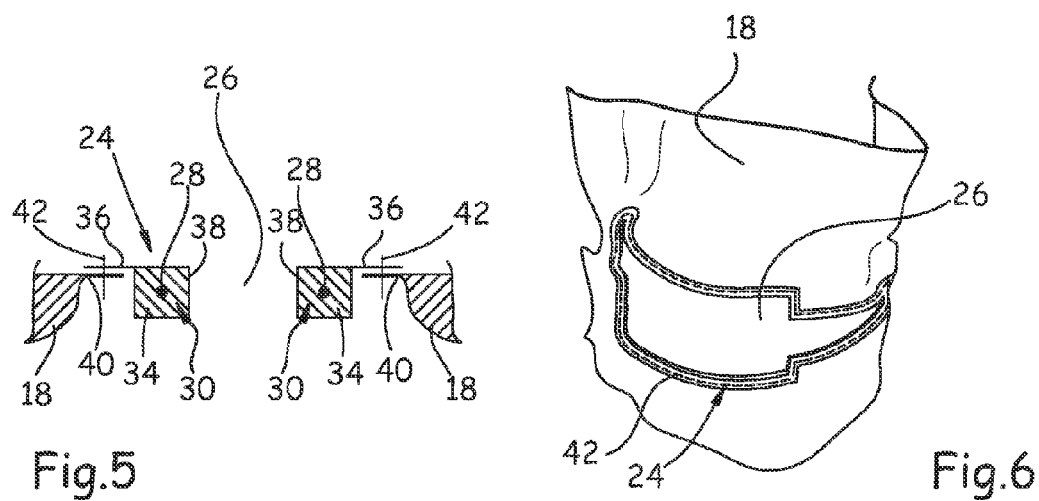
Fig.5
Fig.6

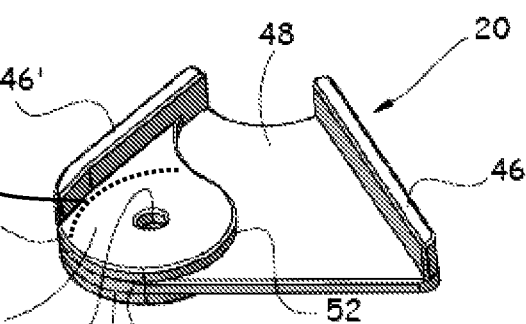
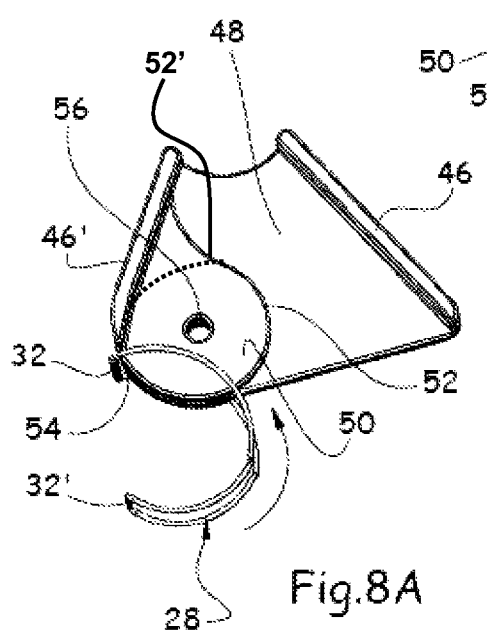
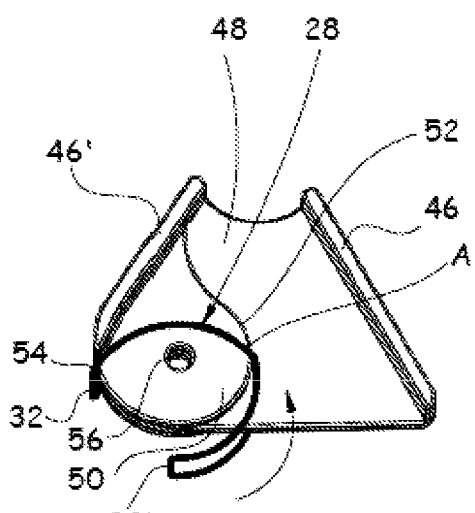
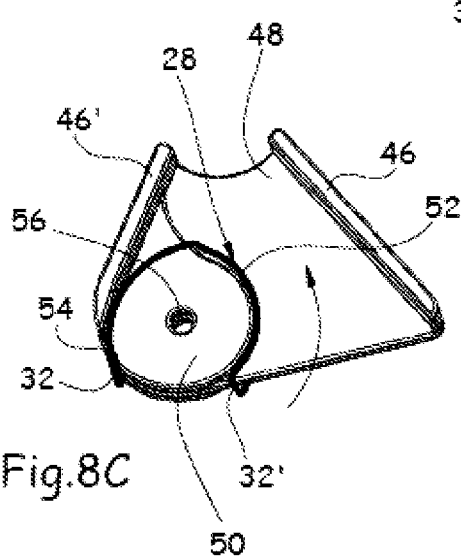

SEALING DEVICE BETWEEN A CROSS MEMBER AND INSULATION BLANKET PROVIDED AT AN AIRCRAFT FUSELAGE

BACKGROUND OF THE INVENTION

1. Field of the Invention

This invention relates to an insulation blanket that is provided at an aircraft fuselage that is equipped with a sealing device between a through element and said insulation blanket as well as an aircraft that is equipped with said blanket.

2. Description of the Related Art

Figure 1:
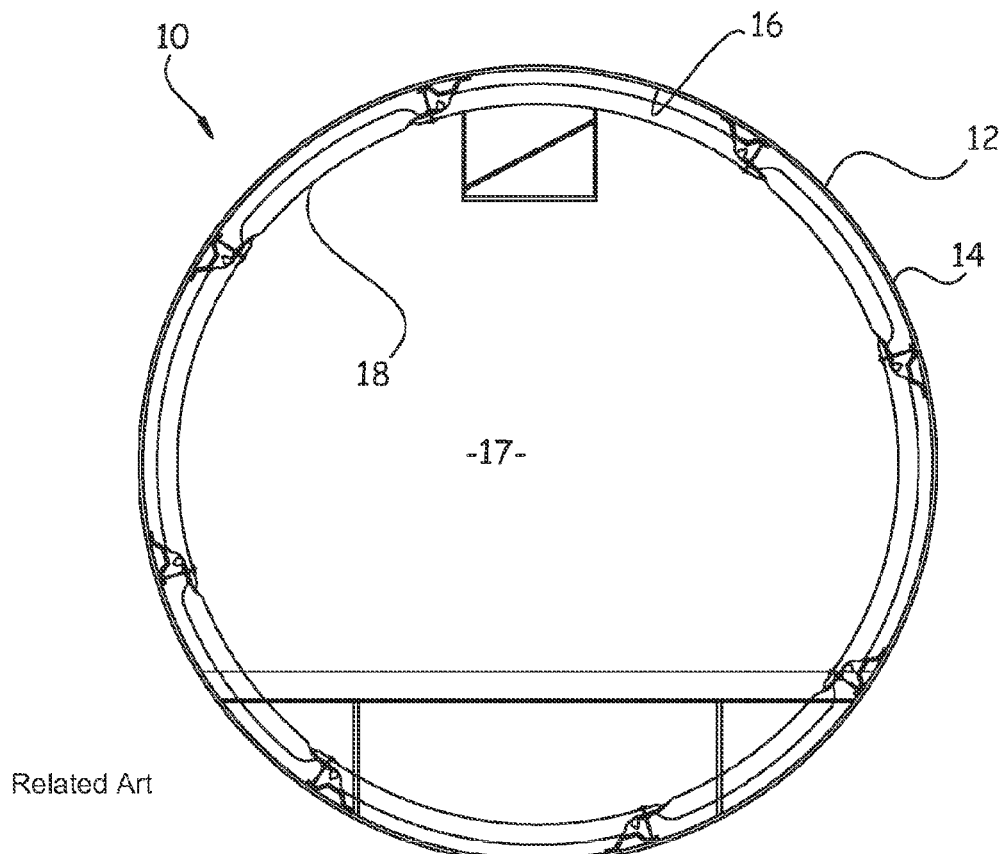
Figure 2:
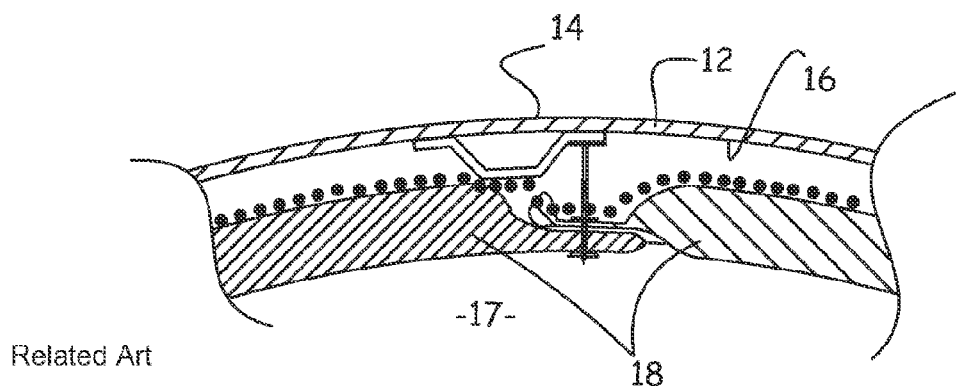

FIGS. 1 and 2 diagrammatically show a transverse cross-section of an aircraft fuselage 10.

The aircraft fuselage comprises a skin 12 with an outside surface 14 that is in contact with the outside environment of the aircraft and an inside surface 16 and a passenger cabin 17.

In a flight phase, an air-conditioning system makes it possible to keep the temperature inside the cabin 17 around 20° C. with a constant relative humidity for the comfort of the passengers whereas the temperature outside of the aircraft is around −50° C.

To limit the losses and to ensure comfort to passengers, at least one insulation blanket 18 is provided at the inside surface 16 of the skin of the fuselage.

After the installation of this insulation blanket 18, there is a space between said blanket 18 and the skin 12 at the level of which the hot and moist air coming from the cabin 17 circulates.

During flight, the inside surface 16 of the skin has a temperature that is less than 0° C. although the humidity that comes from the cabin tends to condense and to freeze at said surface 16.

During the landing phase, the temperature of the air outside of the aircraft is increasingly warm although the ice that is formed at the inside surface 16 tends to melt and to drip onto the insulation blanket 18 up to the lower part of the fuselage where the condensates are recovered and then removed.

Consequently, in addition to its function as insulation, the insulation blanket 18 serves to seal the inside of the aircraft and to drain the condensates to prevent them from dripping on the passengers or on sensitive systems, such as, for example, electrical circuits.

To ensure these two additional functions, the insulation blanket 18 comprises an impermeable film at its surface opposite the inside surface 16 of the skin of the fuselage.

According to one embodiment, an insulation blanket consists of a layer of a thermally insulating material, such as, for example, glass wool, bagged in an airtight plastic film.

Generally, this insulation blanket 18 is made of several parts that are juxtaposed in such a way as to cover the inside surface 16 of the skin of the fuselage. As illustrated in FIG. 2, at a junction zone, the parts overlap and are arranged like tiles. Adhesive strips can also be used to join the two parts and thus to improve the seal.

The seal of the insulation blanket 18 may prove problematic at the passage of a through element 20 connected to the skin 12, such as, for example, a support in yoke form that ensures the attachment of a connecting rod 22 or link as illustrated in FIG. 3.

Hereinafter, an element that is connected to the skin, that passes through the insulation blanket and that offers, for example, an attachment system for maintaining systems or components of the aircraft, is called a through element.

According to one method for installing the insulation blanket 18, at the level of a through element 20, the blanket 18 is cut to allow it to pass. This installation method is not satisfactory because with the blanket 18 not having any mechanical strength, the edge of the cutout is not kept flattened against the through element 20 although there is always play between this element 20 and the blanket 18 that no longer makes it possible to ensure an optimum seal.

To reinforce the mechanical strength of the blanket 18, it is possible to add a foam block with closed cells, bonded to the blanket 18 and comprising a slot for allowing the through element to pass.

This foam block is light and easy to make integral with the blanket 18 and in a first step makes it possible to ensure a satisfactory sealing barrier.

However, the foam block does not have an elastic property or gradually loses it although play appears between the foam block and the through element that no longer makes it possible to ensure an optimum seal.

SUMMARY OF THE INVENTION

To eliminate the drawbacks of the prior art, the invention proposes an insulation blanket that is equipped with a sealing device between said insulation blanket and a through element that ensures an optimum seal.

For this purpose, the invention has as its object an insulation blanket relative to the inside surface of an aircraft fuselage, whereby said blanket comprises at least one opening that allows the passage of a through element, at which is connected a sealing device, characterized in that this sealing device comprises a core combined with a body that extends over a closed contour delimiting the opening, with the core having a spring action that tends to flatten the body against the through element over at least a part of the circumference of the opening.

BRIEF DESCRIPTION OF THE DRAWING FIGURES

Figure 9:
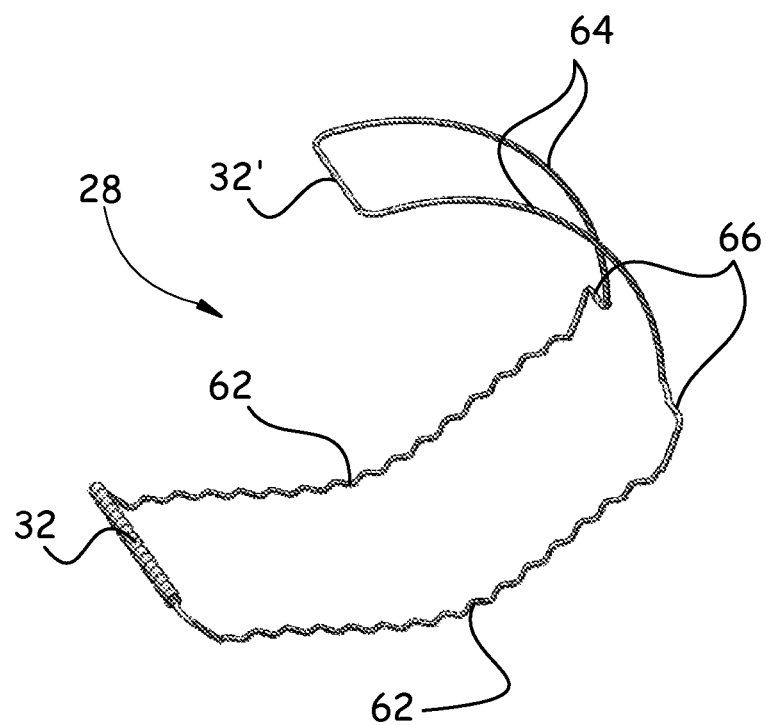

Other characteristics and advantages will emerge from the following description of the invention, a description that is provided only by way of example, relative to the accompanying drawings in which:

FIG. 1 is a transverse cutaway of an aircraft fuselage,

FIG. 2 is a transverse cutaway that illustrates a part of an insulating blanket that is applied at the inside surface of an aircraft fuselage, FIG. 3 is a perspective view that illustrates an example of a through element that is provided at the inside surface of an aircraft fuselage, FIG. 4 is a perspective view of a part that is called the core of the sealing device according to a first variant of the invention, FIG. 5 is a cutaway of a sealing device according to one embodiment of the invention that is connected to a blanket, FIG. 6 is a perspective view of a part of an insulation blanket that is equipped with a sealing device, FIG. 7 is a perspective view of a support that forms a through element according to a preferred embodiment, FIGS. 8A to 8C are views that illustrate the installation of a sealing device according to the invention on a support as illustrated in FIG. 7, and FIG. 9 is a perspective view of a core of a sealing device according to another variant of the invention.

DETAILED DESCRIPTION OF THE INVENTION

The elements that are common to the prior art and to the invention are illustrated in FIGS. 1 to 3 and bear the same references.

In FIGS. 5 and 6, an insulation blanket 18 that comprises a sealing device 24 that delimits an opening 26 that allows the passage of a through element 20 is illustrated in detail.

According to the invention, the sealing device 24 comprises a core 28 that is combined with a body 30 that extends over a closed contour that delimits the opening 26, with the core 28 having a spring action that tends to flatten the body 30 against the through element 20 over at least a part of the circumference of the opening 26.

Advantageously, the core 28 also extends over the entire circumference of the opening 26.

The core is made of a material that achieves a spring action. Thus, this material is to have a relatively high elastic resistance and a relatively small Young's modulus.

According to one embodiment, the core 28 is a metal wire with a 0.8 mm diameter made of a piano-wire-type material.

As a variant, the core 28 could be made of a material with shape memory. The core 28 forms a loop whose profile is essentially identical to that of the cross-section of the through element 20.

The shape of the loop formed by the core 28 at rest is to be such that said core 28 tends to flatten the body 30 against the through element 20 preferably over the entire circumference of the opening 26 when the device is installed.

The loop that is formed by the core 28 is obtained from a folded wire to match the geometry of the cross-section of the through element 20, whereby the ends of the wire are connected by any suitable means. For example, the junction between the two ends can be made by tying the same wire from one end to the other or by using a separate piece.

In general, the through element has a rectangular cross-section to the right of the sealing device 24 when the latter is installed.

The loop that is formed by the core 28 comprises two rectilinear portions 32, 32' arranged opposite the small sides of the rectangular cross-section of the through element, at least one of the two rectilinear portions 32, 32', and preferably both, having a length such that the body 30 of the sealing device interferes with the cross-section of the through element 20.

The body 30 is made of a material that can become deformed in such a way as to assume the shapes of the through element 20. Preferably, the body 30 covers the core 28.

According to one embodiment, the body is made from a silicone-based material. For safety's sake, this material is to be fire-resistant and should not release toxic matter.

The material of the body 30 should make it possible to absorb the points of micro-play between the through element and the core 28, such as, for example, the points of micro-play generated by the surface defects at the surface of the through element.

According to an embodiment that is illustrated in FIG. 5, the body 30 comprises a part 34 with a rectangular cross-section into which the core 28, which extends over the entire circumference of the opening 26, is inserted and a layer 36 that extends on the periphery and outside of the part 34.

According to the variants, the cross-sections of the part 34 and/or the core 28 can have different shapes (circular, rectangular, square, . . . ).

In addition, the cross-sections of the part 34 and/or the core 28 can vary along the circumference of the opening 26.

To ensure better sealing, the cross-section of the part 34 can exhibit a rectilinear portion 38 that can be applied against the through element 20 so as to increase the length of the escape path.

The sealing device 24 is connected to the insulation blanket 18 by any suitable means. According to one embodiment, the insulation blanket 18 comprises a cutout at which the sealing device is placed. The edges 40 of the insulation blanket 18 at this cutout and the layer 36 of the sealing device overlap and are made integral by a peripheral junction line 42 such as sewing or a bonding line.

In FIG. 7, a through element 20 was shown that can be combined with the sealing device of the invention.

This through element 20 comprises at least one base plate 46 that is flattened against the inside surface 16 of the aircraft and a yoke 48 that preferably extends in a plane that is perpendicular to the base plate 46.

According to the invention, the yoke 48 comprises means for holding the sealing device. For this purpose, on at least one of its faces, the yoke 48 comprises an excess thickness 50 that offers an edge 52 that is oriented toward the outside of the aircraft against which the sealing device 24 can rest. Advantageously, this edge 52 is arranged opposite another edge 54 of the yoke 48 against which the sealing device can rest initially during its installation, with the edge 52 having a profile of convex shape relative to the edge 54.

According to an embodiment that is illustrated in FIG. 7, the through element 20 comprises two base plates 46, 46' that are connected by the yoke 48 that comprises a through opening 56 that forms an anchoring point and two excess thicknesses 50 that each offer an edge 52 with a cylindrical portion that is centered relative to the opening 56. The excess thicknesses 50 extend up to the second base plate 46' that is not flattened against the inside surface 16 of the fuselage. The yoke 48 has an edge 58 that is arranged in the extension of the edge 54 over a portion that is removed from the base plate 46 that is set against the inside surface 16.

In addition, the core 28 has a particular shape with two parallel rectilinear portions 32, 32' of which a first rectilinear portion 32 has a length that is essentially equal to or slightly less than the sum of the thicknesses of the yoke 48 and excess thicknesses 50 and of which the second portion 32' has a length that is essentially equal to or slightly less than the thickness of the yoke 48.

These two rectilinear portions 32, 32' are connected by long symmetrical sides 60, 60' relative to a median axis. Each long side 60 or 60' comprises three portions, two curved portions 62, 64 being connected by a rectilinear intermediate portion 66 that is parallel to the rectilinear portions 32, 32' and whose length is essentially equal to the thickness of the excess thickness 50.

The curved portions 62 and 64 are arranged in planes that are perpendicular to the rectilinear portions 32, 32', 66 and have curvature radii that are essentially identical to the cylindrical portion 52' of the edge 52 of the excess thicknesses 50. Thus, the portions 62 of the two long sides 60, 60' are arranged in parallel planes that are separated by a distance that is slightly less than or equal to the sum of the thicknesses of the yoke 48 and excess thicknesses 50, whereas the portions 64 of the two long sides 60, 60' are arranged in parallel planes that are separated by a distance that is slightly less than or equal to the thickness of the yoke 48.

In parallel, the body 30 has shapes that are essentially similar to the core 28 in such a way that the latter is essentially centered inside said body 30.

The installation of the insulation blanket 18 at the level of a through element 20 is illustrated in FIGS. 8A to 8C. To better visualize it, only the core 28 is visible.

In a first step, the operator positions the opening 26 to the right of the through element 20; the sealing device has a bent shape (because of the shape of the core 28) that is oriented toward the wall of the fuselage.

As illustrated in FIG. 7A, the sealing device 24 is applied against the through element 20 at its rectilinear portion 32. Next, it pushes the sealing device and the blanket back toward the skin of the fuselage. During this maneuver, the sealing device tends to pivot around its rectilinear portion 32. During this movement, the portions 66 of the core 28 move along the edges 52.

These edges 52 have shapes such that the distance that separates them from the point of contact of the rectilinear portion 32 tends to increase up to a maximum value that corresponds to point A.

When the portions 66 reach point A, as illustrated in FIG. 7B, the deformation of the core 28 is maximum. This point passed, the core 28 retracts until the portion 32' comes into contact with the edge of the yoke 48, as illustrated in FIG. 7C.

In this position, the curved portions 64 of the core are arranged against the edges 52 of the excess thicknesses 50 and ensure the holding of the attachment device and the blanket.

According to another variant that is illustrated in FIG. 9, the portions 62 can have a sinusoidal profile to increase the rigidity of the core 28 and to increase the pressure of contact between the sealing device and the through element 20. The sealing device offers the following advantages:

To the extent that the core 28 can become deformed elastically in the manner of a spring and that the body 30 can become deformed in the manner of a foam, the sealing device makes it possible to absorb the manufacturing tolerances of the through element.

The sealing device can be connected to the blanket at the factory although the deposition time of the blanket that is equipped with the sealing device is as fast as for a split blanket without a sealing device.

The sealing device can adapt to all of the through elements to the extent that it is sufficient for tailor-making the core 28 to match the geometry of the through element to which it is to be connected.

The sealing device has a mass that is equivalent to the solutions of the prior art while producing better sealing.

The presence of excess thickness at the through element makes it possible to keep the sealing device in place despite the vibrations of the aircraft.

The invention claimed is:

1. An insulation blanket configured to be connected at an inside surface of an aircraft fuselage and to allow the passage of a structural element, comprising:
   at least one opening that allows passage of the structural element; and
   a sealing device configured to be installed as a single unit, the sealing device comprising first and second parallel rectilinear portions and including a core that is combined with a body that extends over a closed contour delimiting the at least one opening, the core having a spring action adapted to flatten the body against the through element over at least a part of a circumference of the opening.

2. The insulation blanket according to claim 1, wherein the core extends over the entire circumference of the opening.

3. The insulation blanket according to claim 2, wherein the core forms a loop whose profile is essentially identical to that of a cross-section of the through element.

4. The insulation blanket according to claim 2, wherein the core is a metal wire that is made of a piano-wire material.

5. The insulation blanket according to claim 4, wherein the wire has a sinusoidal profile over at least one portion to increase a pressure of contact on the through element.

6. The insulation blanket according to claim 1, wherein the core is made of a material with shape memory.

7. The insulation blanket according to claim 1, wherein the body is made from a silicone-based material that covers the core.

8. The insulation blanket according to claim 7, wherein the body comprises:
   a part into which the core, that extends over the entire circumference of the opening, is inserted; and
   a layer that extends on the periphery and outside of the part.

9. The insulation blanket according to claim 8, further comprising edges that overlap with the layer of the sealing device, whereby said edges and said layer are made integral with a peripheral junction line.

10. An aircraft fuselage that comprises the insulation blanket according to claim 1, wherein the through element is configured for holding the sealing device.

11. The aircraft fuselage according to claim 10, wherein the aircraft fuselage comprises a through element that comprises:
   an edge that is oriented toward an outside of the aircraft, the edge being formed from an excess thickness on one face of the through element.

12. The aircraft fuselage according to claim 11, wherein the through element further comprises:
   two base plates;
   a yoke connecting the two base plates, the yoke comprising a through opening that forms an anchoring point; and
   two excess thicknesses of the yoke, each offering an edge with a cylindrical portion that is centered relative to the opening.

13. The aircraft fuselage according to claim 12, wherein the core comprises:
   the first and second parallel rectilinear portions of which the first rectilinear portion has a length that is approximately equal to or slightly less than a sum of thicknesses of the yoke and excess thicknesses and of which the second portion has a length that is approximately equal to or slightly less than the thickness of the yoke; and
   two long sides that connect said two rectilinear portions, each side comprising two curved portions.

14. The aircraft fuselage according to claim 13, wherein the curved portions are arranged in planes that are perpendicular to the rectilinear portions and have curvature radii that are essentially identical to a cylindrical portion of the edge of the excess thicknesses, with the portions of the two long sides being arranged in parallel planes that are separated by a distance that is slightly less than or equal to the sum of the thicknesses of the yoke and the excess thicknesses, and with the portions of the two long sides being arranged in parallel planes that are separated by a distance that is slightly less than or equal to the thickness of the yoke.

15. The insulation blanket according to claim 3, wherein the core is a metal wire that is made of a piano-wire material.

16. The insulation blanket according to claim 2, wherein the core is made of a material with shape memory.

17. The insulation blanket according to claim 2, wherein the body is made from a silicone-based material that covers the core.

18. An insulation blanket configured to be connected at an inside surface of an aircraft fuselage, comprising:
   at least one opening that allows passage of a fuselage structural element; and
   a sealing device comprising a wire core that is combined with a body that extends over a closed contour delimiting the at least one opening, the core being a loop with a sinusoidal profile and having a spring action adapted to flatten the body against the fuselage structural element over at least a part of a circumference of the opening.

19. An aircraft fuselage comprising:
a fuselage structural element;
an insulation blanket having at least one opening that allows passage of the fuselage structural element; and
a sealing device comprising a wire core that is combined with a body that extends over a closed contour delimiting the at least one opening, the core being a loop with a sinusoidal profile and having a spring action adapted to flatten the body against the fuselage structural element over at least a part of a circumference of the opening,
wherein the fuselage structural element comprises:
two base plates;
a yoke connecting the two base plates, the yoke comprising a through opening that forms an anchoring point; and
two excess thicknesses of the yoke, each offering an edge with a cylindrical portion that is centered relative to the opening.

\* \* \* \* \*